March 20, 1928. Re. 16,912
J. D. HILLIARD
ELECTRIC SWITCH
Original Filed Feb. 8, 1921
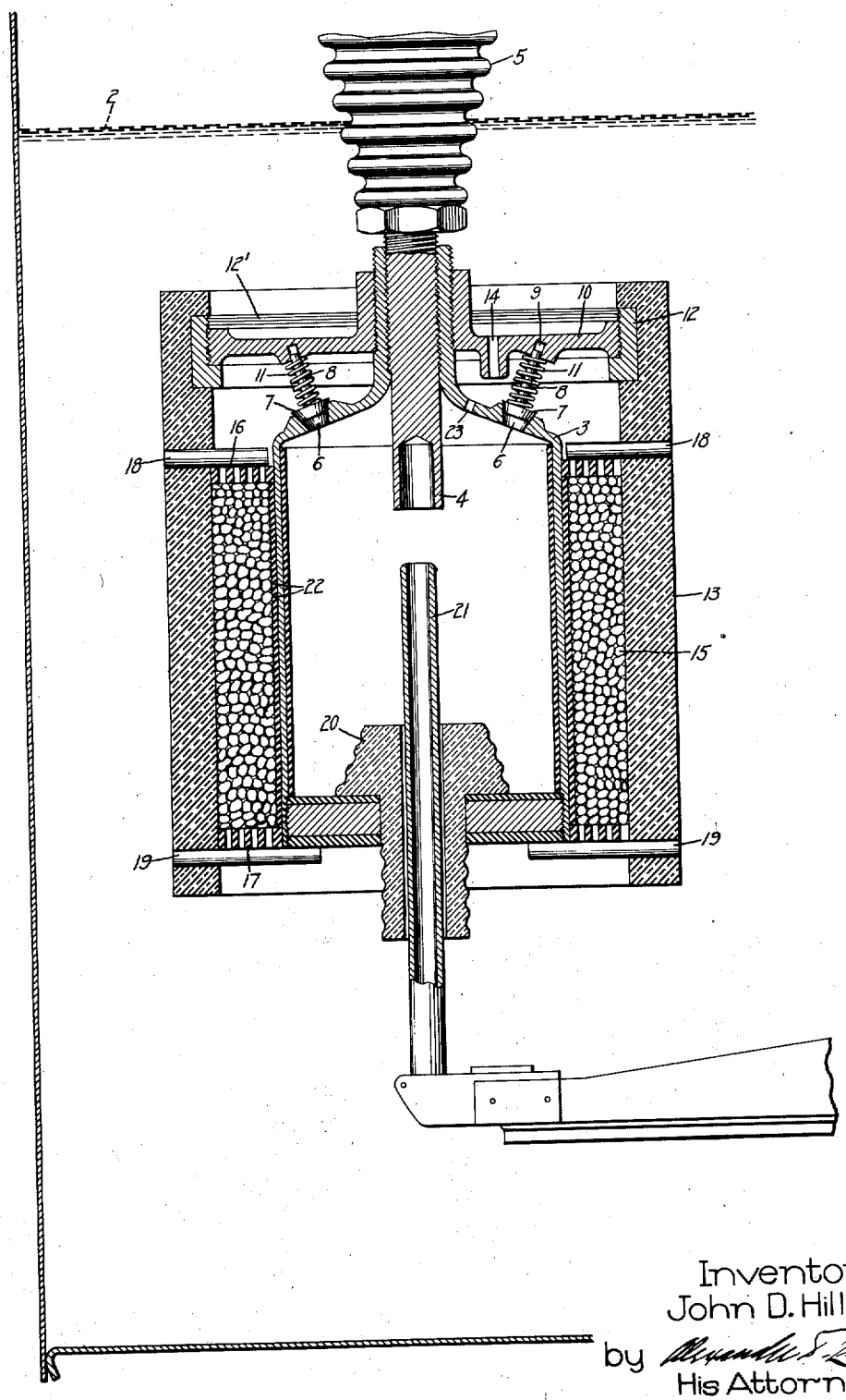
Inventor:
John D. Hilliard,
by Alexander S. Lunt
His Attorney.

Reissued Mar. 20, 1928. Re. 16,912

UNITED STATES PATENT OFFICE.

JOHN D. HILLIARD, OF SCHENECTADY, NEW YORK, ASSIGNOR TO GENERAL ELECTRIC COMPANY, OF SCHENECTADY, NEW YORK, A CORPORATION OF NEW YORK.

ELECTRIC SWITCH.

Original application filed February 8, 1921, Serial No. 443,440. Divided and application filed November 23, 1922, Serial No. 602,703. Original No. 1,551,514, dated August 25, 1925. Application for reissue filed August 12, 1926. Serial No. 128,883.

My invention relates to electric switches and especially to switches of the type wherein a circuit is broken by the separation of contacts or electrodes immersed in an insulating or arc-extinguishing fluid.

When opening high power circuits under oil, the arc formed upon separation of the switch contacts causes a certain amount of the oil to be disassociated or volatilized, thereby producing within the body of the oil a quantity of highly heated gas, the generation of which may create a pressure sufficient to eject oil from the tank or even to injure the tank itself. The oil ejected from the tank is in a more or less atomized condition and is often carbonized so that it forms a black deposit on objects with which it comes into contact. The oil is ejected by highly heated gas which, upon contact with the air, may cause secondary explosions of sufficient violence to burst the oil tank or tear it from its supports. Even where the direct injury from the explosion is slight, the fire risk is increased, and it has frequently happened that such explosions have resulted in a short circuit which seriously interfered with the operation of the system to which the switch was connected.

According to the invention disclosed in my copending application Serial No. 443,440, filed February 8, 1921, of which this application is a division and which application is assigned to the same assignee as the present application, I so construct the switch that when the circuit is broken under oil no oil is ejected from the switch tank and secondary explosions caused by contact of heated gas with the air are prevented. To accomplish this result, I interpose in the path of the fluid set in motion by the arc a means which will prevent the ejection of liquid from the tank, will separate a large part of the oil vapor and atomized oil from the gas, and will cool the fluids ejected from the tank to a temperature below that at which they spontaneously ignite upon contact with the air. These results are produced by causing the moving liquid to be broken up into a plurality of fine streams which are caused to flow by circuitous passages through a cooling material. I preferably arrange these passages to communicate with the upper part of the chamber within which the circuit is broken so that the liquid, put into motion by the pressure resulting from the gases formed by the arcs is thrown toward the top of the chamber into these passage-ways where its flow is impeded to cool it and separate it from the intermingled gases. While the specific means used to break up the moving fluids may assume a variety of forms, I prefer to use a material having a high dielectric strength such as quartz gravel which may vary considerably in size, pebbles from ½ to ¾ inch being satisfactory in many cases.

My present invention has for its purpose the provision of means by which the perforated barrier described above may be utilized in connection with a fluid break switch of the well known explosion chamber or oil blast type. My present invention also has for its purpose the provision of means for quickly relieving the pressure within the pressure chamber of the switch. My invention will be better understood from the following description taken in connection with the accompanying drawing, its scope being pointed out in the appended claims.

Referring now to the drawing there is illustrated in the single figure thereof a tank 1 containing an insulating liquid 2 within which is immersed an explosion chamber casing 3 formed of steel or other suitable material and arranged to be supported from the top (not shown) of the tank 1 by the stationary contact or electrode 4 and the insulator 5 which is shown as partially broken away. The explosion chamber casing 3 is provided with openings 6 at its upper end within which are adapted to be seated valve heads 7 carried upon stems 8 arranged to slide within the recesses 9 formed in the circular plate 10. Springs 11 are interposed between the valve heads 7 and the plate 10 for maintaining the valves in closed position. The plate 10 and the insulating casing 13 together form a receptacle which surrounds the top and sides of the explosion chamber 3 but does not envelop the bottom thereof. The plate 10 is provided with screw threads around its periphery which engage threads 12′ formed in a metallic ring 12 mounted in the insulating casing 13. The plate 10 forms a tight joint between the casings 3 and 13. Small bleed holes 14 and 23 are provided for the purpose of permitting the oil to assume its normal level within the explosion chamber and the annular chamber formed around it by the casing 13.

Between the casings 3 and 13 is arranged a barrier 15 composed of gravel or other suitable material and held in place by perforated rings 16 and 17 which are maintained in fixed position by means of pins 18 and 19. An insulator 20 is supported through an opening in the bottom of the explosion chamber casing 3 and is provided at its center with an opening through which the tubular movable electrode 21 is arranged to be moved in opening and closing the switch. The explosion chamber is lined on the inside and covered on the outside with an insulating material 22.

The insulating fluid 2 in and around the casing 13 is normally maintained at a level above the top of the chamber formed between the casings 3 and 13. When the electrodes 4 and 21 are separated to break the circuit, any arc formed between them will volatilize or dissociate a part of the ambient insulating fluid thereby creating gases which produce pressure within the explosion chamber. The pressure so produced is effective in interrupting the arc by reason of the fact that it blows a blast of insulating liquid directly across the path of the arc drawn between parts 4 and 21 thereby cooling and extinguishing the same.

The pressure within the explosion chamber is limited by the valves which open at a predetermined pressure and permit the gas and vapor to escape into the chamber beneath the plate 10 which may contain above the lower edge of the opening 14 an amount of air sufficient to form a cushion for the escaping gas whereby damage to the apparatus by the force of the explosion is prevented. The pressure created within this space causes the vapor and gas to be forced downwardly through the gravel barrier 15 where they are cooled and condensed and from whence they escape to the surface of the liquid 2 in the outer tank 1.

My invention may be embodied in other forms than that shown and described and I, therefore, intend to cover by the appended claims all changes and modifications apparent to those skilled in the art and within the scope of my invention.

What I claim as new and desire to secure by Letters Patent of the United States is:—

1. In a fluid switch, a receptacle having an outlet at one end thereof, a pressure chamber within said receptacle having an outlet at the opposite end thereof, and a barrier composed of granular material between said receptacle and said chamber.

2. In a switch, a pressure chamber containing a liquid, electrodes arranged to form an arc within said chamber, said chamber having at the opposite ends thereof a liquid outlet for discharging said liquid into the path of said arc and a gas outlet for discharging the gas created by said arc, and means surrounding said chamber for cooling said gas.

3. In a fluid switch, a tank adapted to contain an insulating fluid, a receptacle therein having an opening at one end thereof, a second receptacle enclosing said first named receptacle and having an opening at the opposite end thereof, switch contacts within said first named receptacle, and means between said receptacles for cooling the gases formed upon the separation of said contacts.

4. In a fluid switch, a receptacle having an opening at one end thereof, a second receptacle enclosing said first named receptacle and having an opening at the opposite end thereof, switch contacts within said first named receptacle, and gravel located between said receptacles for cooling the gases and condensing the vapors formed upon the opening of the circuit.

5. In a fluid switch, a tank adapted to contain an insulating fluid, a receptacle within said tank, said receptacle being open at its bottom, a second receptacle within said first named receptacle, said second receptacle being adapted to be submerged in and filled with an insulating fluid, said second receptacle being provided with an opening at its top, arcing electrodes within said second receptacle and granular cooling material between said receptacles.

6. In a fluid switch, a tank adapted to contain an insulating fluid, a receptacle within said tank, said receptacle being open at its bottom, a second receptacle within said first named receptacle, said second receptacle being adapted to be submerged in and filled with an insulating fluid, said second receptacle being provided with an opening at its top, a valve seated in said opening and adapted to open at a predetermined pressure, a stationary electrode located in said second receptacle, an electrode adapted to cooperate with said stationary electrodes and movable through an opening in the lower part of said second receptacle and granular cooling material between said receptacles.

7. A fluid break switch comprising a tank adapted to contain an insulating liquid, a receptacle therein having a contact receiving opening, contacts arranged to separate in the receptacle, one of said contacts being withdrawable through said opening, said receptacle having gas discharge openings therein and valves for controlling the openings, and cooling means in communication with the openings.

8. A fluid break switch comprising a tank adapted to contain an insulating liquid, a receptacle therein, relatively movable contacts arranged to separate initially in the receptacle, said receptacle being provided with a contact opening and with a pressure relief opening and cooling means arranged in communication with said pressure relief opening.

9. A fluid break switch comprising a tank adapted to contain an insulating liquid, a pressure chamber therein having a contact receiving opening, stationary and movable contacts arranged to separate in the pressure chamber, said chamber being provided with means for increasing the efficiency of the switch comprising gas discharge openings, and valves for controlling the discharge of fluid through said openings.

10. A liquid break switch comprising a pressure chamber containing a fixed contact, a movable contact engaging the fixed contact within the chamber, said chamber having an opening through which the movable contact is withdrawn and through which a blast of liquid is projected into the path of an arc and said chamber being provided with a bleed opening and with a discharge opening for limiting the pressure in the chamber.

11. A fluid break switch comprising a pressure chamber adapted to contain an insulating liquid, and relatively movable contacts arranged to separate initially therein, said chamber having an outlet for discharging liquid into the path of the arc between said contacts and means comprising a separate outlet for the discharge of gas formed in the chamber by the arc for limiting the pressure in said pressure chamber.

12. A fluid break switch comprising a tank adapted to contain an insulating liquid, cooperating fixed and movable contacts, a pressure chamber in said tank and containing the fixed contact having an opening through which the movable contact is adapted to be withdrawn, said chamber having additional openings effective to release a sufficient quantity of gas and liquid to limit the pressure produced in said chamber when the switch is opened.

13. A fluid break switch comprising a tank adapted to contain insulating liquid, a pressure chamber in said tank, a fixed contact and a cooperating movable contact rod separable in said chamber, said pressure chamber having an opening in the bottom thereof through which the contact rod is adapted to be withdrawn and said chamber having a gas discharge opening at the top thereof through which a sufficiently large quantity of gas formed in the chamber may be quickly released to limit the pressure therein.

In witness whereof, I have hereto set my hand this 23d day of July, 1926.

JOHN D. HILLIARD.